United States Patent
Wakazono et al.

(10) Patent No.: US 7,220,090 B2
(45) Date of Patent: May 22, 2007

(54) LINEAR MOTOR OPERATED MACHINE TOOL

(75) Inventors: Yoshio Wakazono, Nagoya (JP); Kozo Imanishi, Anjo (JP); Fumitaka Achiwa, Nagoya (JP)

(73) Assignee: Toyoda Koki Kabushiki Kaisha, Kariya-shi (JP)

( * ) Notice: Subject to any disclaimer, the term of this patent is extended or adjusted under 35 U.S.C. 154(b) by 205 days.

(21) Appl. No.: 10/845,349

(22) Filed: May 14, 2004

(65) Prior Publication Data

US 2005/0008441 A1    Jan. 13, 2005

(30) Foreign Application Priority Data

| May 14, 2003 | (JP) | ............................. 2003-135885 |
| May 14, 2003 | (JP) | ............................. 2003-135911 |
| Oct. 2, 2003 | (JP) | ............................. 2003-344313 |

(51) Int. Cl.
*B23C 1/27* (2006.01)

(52) U.S. Cl. .................. 409/235; 409/230; 310/12

(58) Field of Classification Search ............... 409/235, 409/190, 191, 202, 212, 219, 230; 29/33 P, 29/561, 563; 408/234; 310/12, 13, 14
See application file for complete search history.

(56) References Cited

U.S. PATENT DOCUMENTS

| 5,662,568 A | | 9/1997 | Lindem |
| 5,688,084 A | * | 11/1997 | Fritz et al. .................. 409/235 |
| 5,933,933 A | * | 8/1999 | Fritz et al. .................... 29/33 P |
| 5,938,577 A | * | 8/1999 | Lindem ....................... 409/235 |
| 6,054,783 A | * | 4/2000 | Philipp et al. ................. 310/12 |
| 6,082,939 A | | 7/2000 | Nakashima et al. |
| 6,217,496 B1 | * | 4/2001 | Lindem ....................... 409/235 |
| 6,514,183 B2 | * | 2/2003 | Hoppe ......................... 409/230 |
| 6,652,204 B2 | * | 11/2003 | Stengele et al. ............. 409/235 |
| 6,826,821 B2 | * | 12/2004 | Geiger et al. .................. 29/563 |
| 2002/0127072 A1 | * | 9/2002 | Stengele et al. ............. 409/235 |

FOREIGN PATENT DOCUMENTS

DE    100 61 934 A1    6/2002

(Continued)

*Primary Examiner*—Boyer D. Ashley
*Assistant Examiner*—Dana Ross
(74) *Attorney, Agent, or Firm*—Oblon, Spivak, McClelland, Maier & Neustadt, P.C.

(57) ABSTRACT

A linear motor actuated machine tool includes a bed, a column, upper and lower X-axis guides, a saddle, upper and lower X-axis linear motor magnets, and upper and lower X-axis linear motor coils. Upper and lower X-axis guides are attached to the upper and lower portion of front surface of the column, which is mounted on the bed in the vertical direction, in the horizontal direction. Upper and lower X-axis linear motor magnets is fixed on the front surface of the column at upper side and lower side of the upper and lower X-axis guides in the direction of X-axis with making pole surfaces thereof face to frontward. Upper and lower X-axis linear motor coils are fixed to upper end and lower end of the rear surface of the saddle, which is mounted on the front surface of the column with being guided by upper and lower X-axis guides and having a through space at the center portion thereof, with opposing to upper and lower X-axis linear motor.

6 Claims, 9 Drawing Sheets

FOREIGN PATENT DOCUMENTS

| | | |
|---|---|---|
| EP | 0 614 724 A2 | 9/1994 |
| EP | 0 742 072 A2 | 11/1996 |
| EP | 0 868 774 B1 | 10/1998 |
| EP | 1 238 752 A1 | 9/2002 |
| JP | 10-191617 | 7/1998 |
| JP | 2001-211631 | 8/2001 |
| WO | WO 02/00387 A2 | 1/2002 |

* cited by examiner

LINEAR MOTOR OPERATED MACHINE TOOL

CROSS-REFERENCE TO RELATED APPLICATION

This application based on and claims priority under 35 U.S.C §119 to Japanese Patent Applications No. 2003-135911 filed on May 14, 2003, No. 2003-344313 filed on Oct. 2, 2003 and No. 2003-135885 filed on May 14, 2003, the entire contents of which are incorporated herein by reference.

BACK GROUND OF THE INVENTION

1. Field of the Invention

The present invention relates to a linear motor operated machine tool, which is driven by linear motor so as to position a tool relative to a workpiece.

2. Description of the Related Art

U.S. Pat. No. 5,662,568 discloses a conventional machine tool driven by linear motor. This conventional machine tool includes a bed, a column, a saddle, X-axis guides, Y-axis guides, a slide, a spindle, X-axis linear motors, and Y-axis linear motors. Upper and lower X-axis guides are respectively attached horizontally to upper side and lower side of front surface of the column, which is mounted on the bed in vertical direction. On the column, The saddle is supported by upper and lower X-axis guides so as to be movable in a direction of the X-axis by the X-axis linear motor. Right and left Y-axis guides are vertically attached to respectively opposing vertical surface in a through space located in the middle of the saddle. Thus, perpendicular direction to Y-axis guides is parallel to X-axis guides. The slide, which retains a spindle head, is supported on the saddle by right and left Y-axis guides so as to be movable in a direction of Y-axis by the Y-axis linear motor. The spindle which is capable to attach tools is supported by the spindle head.

Further, in the conventional machine tool, upper and lower X-axis linear motor magnets are respectively disposed on the horizontal surfaces of the column in the direction of the X-axis in such the way that a pole surface of the upper X-axis linear motor oppose to a pole surface of the lower X-axis linear motor. Upper and lower X-axis linear motor coils are respectively disposed on the top surface and bottom surface of the saddle so as to oppose to the upper and lower X-axis linear motor magnets respectively. Right and left Y-axis linear motor magnets are respectively disposed on vertical surfaces, which are opposed to each other in the through space of the saddle, in such a way that a pole surface of the right Y-axis linear motor oppose to a pole surface of the left Y-axis linear motor. Right and left Y-axis linear motor coils are respectively disposed on side surfaces of the slide so as to oppose to the right and left Y-axis linear motor magnets respectively.

With such conventional configuration, upper and lower X-axis linear motor magnets are disposed to oppose to each other so that X-axis linear motor do not attract X-axis guides by self-canceling magnetic force generated by upper and lower X-axis linear motor. Similarly, right and left Y-axis linear motor magnets are disposed in the through space of the saddle opposing to each other so that Y-axis linear motors do not attract Y-axis guides by self-canceling magnetic forces generated by right and left Y-axis linear motors.

However, long length of the through space, i.e. the saddle, in the direction of Y-axis is required so as to assure sufficient stroke of the slide in a direction of the Y-axis, and to avoid interference between a ceiling of the through space and wires which supply electric power to the Y-axis linear motors. Long length of the saddle in the direction of Y-axis causes lowering of rigidity of the machine tool resulting from long distance between the upper X-axis linear motor and the lower X-axis linear motor. Therefore, it is difficult to enlarge servo gain, acceleration performance is lowered due to large mass of the saddle, and size of the machine tool becomes large.

Further, in the conventional machine tool, a tip portion of the spindle supported by the spindle head inclines to lower side in relation to the ideal horizontal axis because mass of the spindle head bends the Y-axis guide so as to relocate the saddle. To eliminate the inclination of the spindle, an adjusting operation is carried out in such a way that the spindle is previously inclined to the side opposite to the direction to which spindle is inclined by its own mass relative to the ideal horizontal axis by inserting a spacer between the Y-axis guide and a mounting portion of the saddle. This adjusting operation includes large number of steps, for example, a step for attaching the slide having the spindle head on the saddle by Y-axis guide, a step for measuring an angle of the inclination of the spindle supported by the spindle head, a step for removing the slide having the spindle head from the saddle, and a step for inserting a spacer between the Y-axis guide and the mounting surface for Y-axis guide in accordance with the measured angle of the inclination. Therefore, the adjustment operation has need of large amount of times, fatigues and costs.

Still further, in the conventional machine tool, upper and lower X-axis linear motor coils are disposed on inner periphery of the saddle, and similarly, right and left Y-axis linear motor coils are disposed on inner periphery of the slide. Therefore, the spindle head or the like must be removed to attach/remove the X-axis or Y-axis linear motor coils. In addition, in the case that a magnet piece configuring the X-axis linear motor or the Y-axis linear motor overlaps with the X-axis linear motor coil or Y-axis linear motor coil wherever the saddle or the slide is located, it is difficult to remove the magnet piece. Therefore, there is a problem that a special jig and long working time are required to attach/remove the magnet piece.

SUMMARY OF THE INVENTION

The present invention is summarized in that a linear motor actuated machine tool including a bed; a column mounted on the bed in the vertical direction; upper and lower X-axis guides attached to the upper and lower portion of front surface of the column in the horizontal direction; a saddle mounted on the front surface of the column with being guided by upper and lower X-axis guides and having a through space at the center portion thereof; upper and lower X-axis linear motor magnets fixed on the front surface of the column at upper side and the lower side of the upper and lower X-axis guides in the direction of the X-axis with making pole surfaces thereof faces to frontward; and upper and lower X-axis linear motor coils fixed to upper end and lower end of the rear surface of the saddle with opposing to upper and lower X-axis linear motor magnets. The linear motor operated machine tool further includes right and left Y-axis guides disposed on the front surface of the saddle at both side of the through space in the vertical direction; a slide mounted on the front surface of the saddle with being guided by right and left Y-axis guides; right and left Y-axis linear motor magnets fixed on the front surface of the saddle at right side and left side of the right and left Y-axis linear guides in the direction of Y-axis with making pole surfaces thereof face to frontward; and right and left Y-axis linear motor coils fixed to right end and left end of the rear surface of the slide with opposing to right and left Y-axis linear motor magnets, the machine tool still further includes a spindle being capable to be attached the tool; a spindle head rotatably supporting the spindle and integraly fixed to the slide, and whose back end expands toward the though space; and a table mounted on the bed to be movable in the direction of the Z-axis which is perpendicular to the X-axis and Y-axis, and on which workpiece is mounted.

DESCRIPTION OF THE PREFERRED EMBODIMENT

Linear motor operated machine tools according to first to fourth embodiments of the present invention will be described with reference to Figs.

(First Embodiment)

Figure 1:
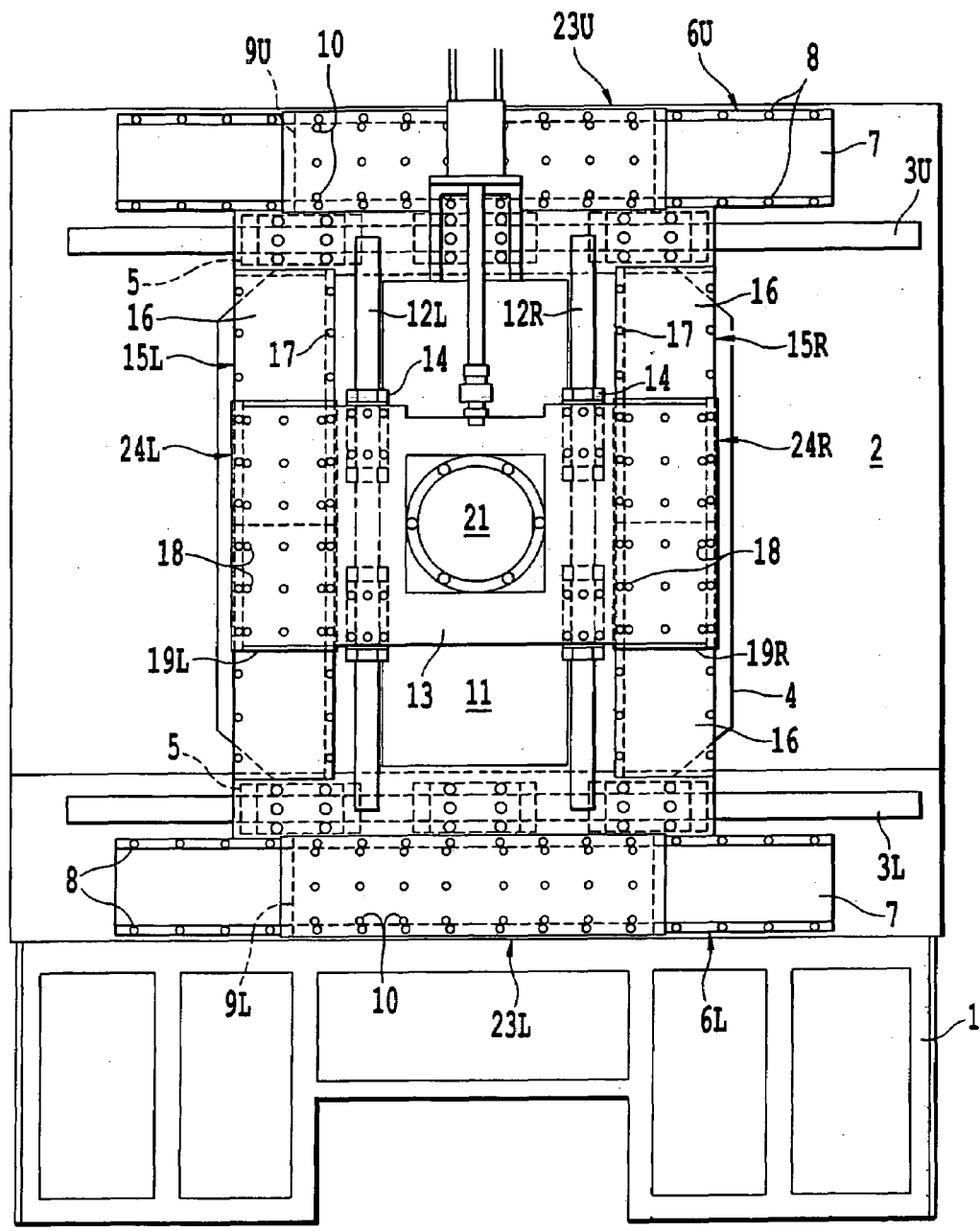
FIG. 1 is a front view showing a linear motor operated machine tool according to embodiments of the present invention with being omitted a part of a table.
Figure 2:
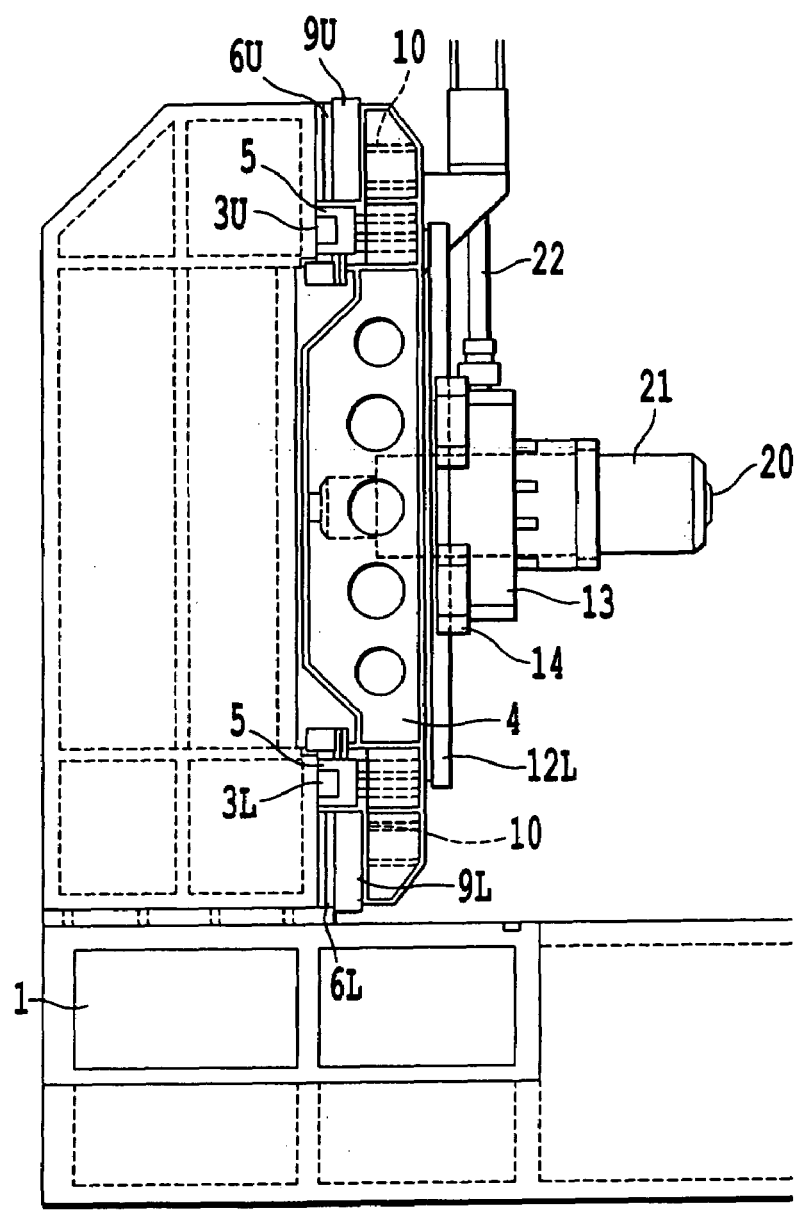
FIG. 2 is a side view showing the machine tool according to embodiments with being omitted the part of the table.

As shown in FIGS. 1 and 2, upper and lower X-axis guide 3U, 3L are attached horizontally to upper side and lower side of the front surface of a column 2, which is mounted on a bed 1 in the vertical direction. A plurality of sliding members 5 fixed to a saddle 4 is movably supported by upper and lower X-axis guides 3U and 3L so that the saddle 4 is mounted on the front surface of the column 2 with being guided by the upper and lower X-axis guides 3U and 3L On the front surface of the column 2, a upper X-axis linear motor magnet 6U is disposed at the upper side of the upper X-axis guide 3U, and a lower X-axis linear motor magnet 6L is disposed at the lower side of the lower X-axis guide 3L. Rectangular magnet pieces 7 configuring upper and lower X-axis magnets 6U and 6L are fastened to the column 2 by way of bolts 8 inserted from front surface of the column 2 to bolt holes 8h bored at both side ends of the magnet pieces 7. Accordingly, upper and lower X-axis linear motor magnets 6U and 6L are fixed on the front surface of the column 2 in the direction of the X-axis with making pole surfaces thereof face to the front side. A plurality of the bolts 10 passes through bolt hole 10h bored at the upper side and lower side of the saddle 4 from the front surface thereof to be screwed into upper and lower X-axis linear motor coils 9U and 9L. Accordingly, the upper and lower linear motor coils 9U and 9L are fixed to an upper side and lower side of the rear surface of the saddle 4 with facing to the upper and lower X-axis linear motor magnets 6U and 6L. The upper linear motor magnet 6U and the upper linear motor coil 9U configure a upper linear motor 23U. The lower linear motor magnet 6L and the lower linear motor coil 9L configure a lower linear motor 23L. The length of each magnet piece 7 and movable range of the saddle 4 are set in such a way that the saddle 4 can be positioned so that the saddle 4 and X-axis linear motor coils 9 do not overlap with each magnet piece 7. Therefore, when the saddle 4 is positioned in far right end of the X-axis direction, two pieces of magnets at left side are ready to be removed from the column 2 easily without overlapping by the saddle 4.

A rectangular through space 11 is formed in the middle portion of the saddle 4 with being adjacent to the upper and lower X-axis guides 3U and 3L so that a back end portion of a spindle head (explained later) can go up and down in the through space 11. On the front surface of the saddle 4, right and left Y-axis guides 12R and 12L are attached at the right side and left side of the through space 11 in the horizontally direction. A plurality of sliding members 14 fixed to a slide 13 are movably supported by the right and left Y-axis guides 12R and 12L. Accordingly, the slide 13 is mounted on the front surface of the saddle 4 with being guided by the right and left Y-axis guides 12R and 12L. Further, on the front surface of the saddle 4, right and left Y-axis linear motor magnets 15R and 15L are disposed at the right side and left side of the right and left Y-axis guides 12R and 12L. Rectangular magnet pieces 16 configuring right and left Y-axis linear motor magnets 15R and 15L are fastened to the saddle 4 by way of bolts 17 inserted from the side of front surface to the bolt holes 17h bored at both ends of the magnet pieces 16. Thus, right and left Y-axis linear motor magnets 15R and 15L are fixed to the front face of the saddle 4 in the direction of the Y-axis with making the pole surface thereof face to the front side. A plurality of bolts 18 inserted to bolt holes 18h bored at right end and left end of the slide 13 from the side of the front surface is screwed into right and left Y-axis linear motor coils 19R and 19L. Accordingly, the right and left Y-axis linear motor coil 19R and 19L are fixed to the right end and left end of the rear surface of the slide 13 with facing to the right and left Y-axis linear motor magnets 15R and 15L The right Y-axis linear motor magnet 15R and the right Y-axis linear motor coil 19R configure a Y-axis linear motor 24R, and the left Y-axis linear motor magnet 15L and the left Y-axis linear motor coil 19L configure a Y-axis linear motor 24L The length of each magnet piece 16 and movable range of the slide 13 are set in such a way that the slide 13 can be positioned so that the slide 13 and Y-axis linear motor coils 19 do not overlap with each magnet piece 16 in order to perform same easy removing as magnet pieces 7 for X-axis.

The spindle head 21 which rotatably supports a spindle 20 is fixed to the slide 13. The back end portion of the spindle head 21 extends to the rectangular through space 11. A tip end portion of the spindle 20 is configured to be attachable a tool. A balance cylinder mechanism 22 is disposed between the slide 13 and the saddle 4 to generate thrust balance with the mass of the slider 13 and spindle head 21.

Figure 3:
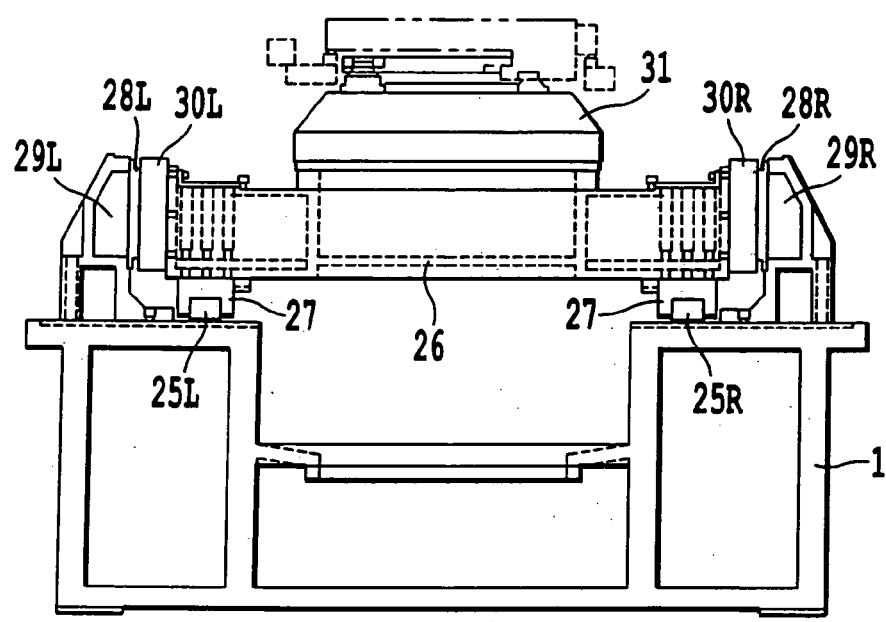
FIG. 3 is a front view showing the machine tool according to embodiments with being omitted a part of a column.
Figure 4:
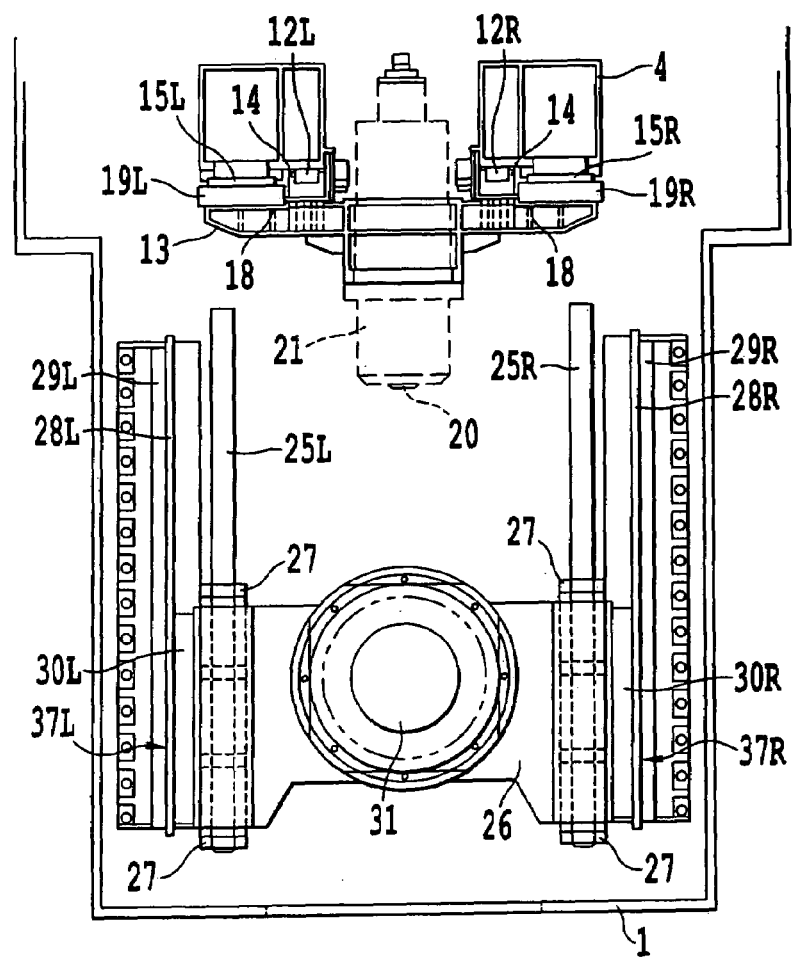
FIG. 4 is a plane view showing the machine tool according to embodiments with being omitted the part of the column.

As shown in FIGS. 3 and 4, right and left Z-axis guides 25R and 25L are attached to the bed 1 in the direction of a Z-axis, which is perpendicular to the X-axis and Y-axis, in front of the column 2. A plurality of sliding members 27 fixed to a table 26 is movably supported by the right and left Z-axis guides 25R and 26L The table 26 is mounted on top surface of the bed 1 in the direction of the Z-axis with being guided by the right and left Z-axis guides 25R and 25L Right and left Z-axis linear motor magnets 28R and 28L are fixed to the top surface of the bed 1 at the right side and left side of the right and left Z-axis guides by way of brackets 29R and 29L. Pole surfaces of the right and left Z-axis linear motor magnets 28R and 29L are in upright stance and are facing with each other. Right and left Z-axis linear motor coils 30R and 30L are fixed to the right end surface and left end surface of the table 26 with facing to right and left Z-axis linear motor magnets 28R and 28L. The right Z-axis linear motor magnet 28R and the right Z-axis linear motor coil 30R configure a right Z-axis linear motor 37R, and the left Z-axis linear motor magnet 28L and the left Z-axis linear motor coil 30L configure a left Z-axis linear motor 37L. A rotating table 31 on which the workpiece is mounted is set on the table 26 so as to be rotatable around the vertical axis thereof. The rotating table 31 is driven by a DD (Direct Drive) motor (not shown).

The operation of the linear motor operated machine tool according to the first embodiment is explained below.

The saddle 4 is moved on the column 2 in the direction of the X-axis by upper and lower X-axis linear motors 23U and 23L with being guided by upper and lower X-axis guides 3U and 3L The slide 3 with spindle head 21 is moved on the saddle 4 in the direction of the Y-axis by right and left Y-axis linear motors 24R and 24L with being guided by right and left Y-axis guides 12R and 12L. Even if the slide 13 rises to upper direction, wires which supply electric power to the right and left Y-axis linear motor coils 19R and 19L do not interference with the saddle 4 because Y-axis linear motor coils are disposed on the front surface of the saddle 4. Thus, the length of the saddle 4 in the vertical direction is set at the short length according to the predetermined stroke of the slide 13. Therefore, the acceleration performance of the saddle 4 is improved due to downsizing and mass saving resulting from shortening the vertical length of the saddle 4. Further, servo gain can be enlarged because of the improvement of the rigidity resulting from shortening the vertical distance between the upper X-axis linear motor 23U and the lower X-axis linear motor 23L.

Right and left Y-axis linear motor magnets 15R and 15L fixed on the front surface of the saddle 4 with making pole surface thereof face to front side. Right and left Y-axis linear motor coils 19R and 19L are attached on the right end and left end of the rear surface of the slide 13 with facing to the right and left Y-axis linear motor magnets 15R and 15L. Therefore, right and left Y-axis linear motor magnets 15R and 15L and right and left Y-axis linear motor coils 19R, 19L are easily attached to (removed from) the saddle 4 and the slide 13 without disassembling right and left Y-axis guides 12R and 12L and the like.

The table 26 on which the workpiece is mounted is moved in the direction of the Z-axis, which is perpendicular to the X-axis and Y-axis, by right and left Z-axis linear motors 37R and 37L with being guided by the right and left Z-axis guides 25R and 25L. Thus, the tool which is attached to the spindle 20 supported by the spindle head 21 is moved relative to the workpiece mounted on the table 26 in the directions of the mutually perpendicular three axes (X-, Y- and Z-axes) so as to machine the workpiece. In this case, pre-load between upper and lower X-axis guide and sliding members 5 is generated by magnetic force of upper and lower X-axis linear motors 23U and 23L so as to increase the bearing rigidity. The pre-load increases resisting force against the moment, which act on the saddle 4 and column 2 to apart from each other. Also, pre-load between right and left Y-axis guides and sliding members 14 is generated by magnetic force of right and left Y-axis linear motors 24R and 24L so as to increase the bearing rigidity. The pre-load increases resisting force against the moment, which act on the slide 13 and saddle 4 to apart from each other. Therefore, the saddle 4 and slide 13 can move with high accuracy and rigidity.

Figure 5:
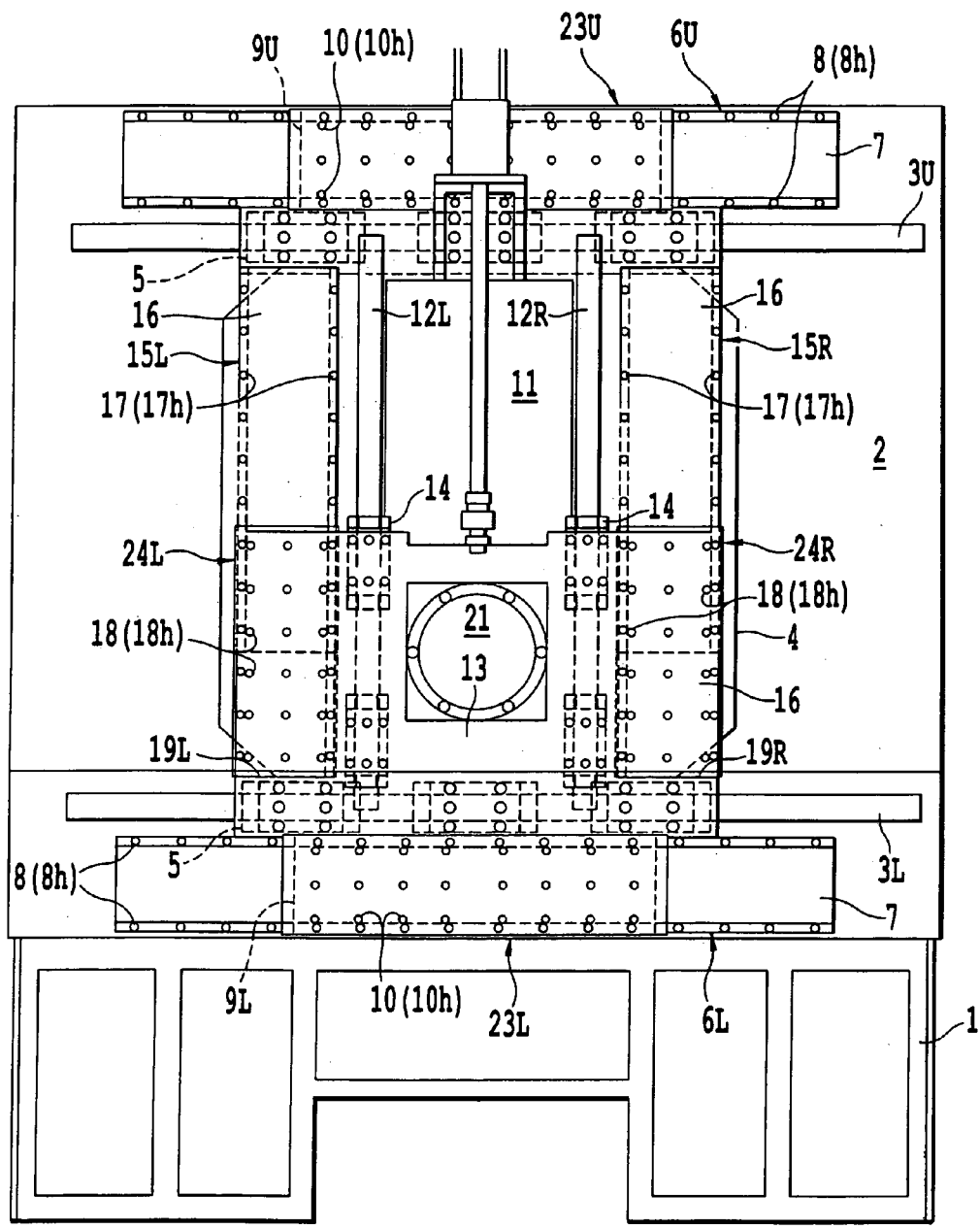
FIG. 5 is a front view showing the machine tool according to embodiments under the condition of a 'lower end'.

Further, in case attaching/removing upper half of magnet pieces 16 composing the right and left Y-axis linear motor magnets 15R and 15L to/from the front surface of the saddle 4, the slide 13 is positioned at a lower end as shown in FIG. 5. In case that slide 13 is positioned at a lower end, the slide 13 and the Y-axis linear motor coil 19 do not overlap with upper half of the magnet pieces 16. Then, bolts 17 are screwed into the saddle 4 through bolt holes 17h bored on the magnet pieces 16 from a side of the front surface so that upper half of magnet pieces 16 are attached to the saddle 4. In case attaching/removing lower half of the magnet pieces 16, the slide 13 is positioned at an upper end. Consequently, It is possible to attach/remove the magnet pieces 16 from the side of the front surface of the saddle 4 under the circumstance that the slide 13 and the Y-axis linear motor coil 19 do not overlap with the magnet pieces 16 to be attached/removed. Therefore, Y-axis linear motor magnets 15 are easily attached to (removed from) the saddle 4 because it is not required to remove the spindle head 21 and the like from the slide 13 and because magnet pieces 16 do not attract the Y-axis linear motor coil 19.

In case attaching/removing right and left Y-axis linear motor coils 19R and 19L to/from the left end and right end of the rear surface of the slide 13, the slide 13 is positioned at an upper end or lower end. In case that the slide 13 is positioned at upper end or lower end, magnet pieces 16 of the Y-axis linear motor magnets are removed. Then, bolts 18 are screwed into Y-axis linear motor coils 19R and 19L through bolt holes 18h bored on the right end and left end of the slide 13 from a side of the front surface so that right and left Y-axis linear motor coils 19R and 19L are attached to the left end and right end of the rear surface of the slide 13. Consequently, right and left Y-axis linear motor coils 19R and 19L are easily attached to (removed from) the left end and right end of the rear surface of the slide 13 because right and left linear motor coils 19R and 19L are not attracted by the linear motor magnets 15. Upper and lower X-axis linear motor magnet 6U and 6L are attached to the column 2 by bolts 8 installed to bolt hole 8h from a side of the front surface as well as the Y-axis linear motor magnets 15. Upper and lower X-axis linear motor coil 9U and 9L are attached to the saddle 4 by bolts 10 installed to bolt hole 10h from a side of the front surface as well as the Y-axis linear motor coils 19.

The first embodiment of the present invention provides following advantages.

On the front surface of the saddle, right and left Y-axis linear motor magnets of the present embodiment are fixed to right side and left side of right and left Y-axis guides with making the pole surface thereof face to frontward. Right and left Y-axis linear motor coils are fixed to right end and left end of the rear surface of the slide with opposing to right and left Y-axis linear motor magnets. Thus, even if the slide rises, wires or the like for supplying the electric power to the linear motor coils do not interference with the saddle. Therefore, acceleration performance of the saddle is improved due to the downsizing and the weight saving resulting from the shortening of the length of the saddle in the vertical direction.

In the present embodiment, X-axis linear motor magnets and Y-axis linear motor magnets are fixed on the front surface of the column and the saddle with making pole surfaces thereof face to frontward. X-axis linear motor coils and Y-axis linear motor coils are fixed to the rear surface of the saddle and the slide. Thus, magnetic force of the X-axis linear motors and Y-axis linear motors provides pre-load between X-axis guides and sliding members and between Y-axis guides and sliding members so as to increase bearing rigidity. Consequently, the saddle and the slide can move with high accuracy and high rigidity.

The machine tool according to present embodiment includes Z-axis linear motors. Therefore, the tool can be relatively controlled to the workpiece in the direction of mutually perpendicular three axes (X-, Y- and Z-axis) by the linear motors with high speed and high accuracy. Further, right and left Z-axis linear motor magnets are fixed on the top surface of the bed with pole surface thereof being in upright stance and facing with each other. Consequently, it is inhibited that magnetic force of the Z-axis linear motors acts on the Z-axis guide mechanism, because of self canceling of the magnetic force of the Z-axis linear motors.

Magnet pieces configuring Y-axis linear motor magnets are fastened to the front surface of the saddle by way of bolts inserted from frontward to bolt holes bored at magnet pieces. A plurality of bolts inserted from frontward to bolt holes bored at right end and left end of the rear surface of the slide is screwed into right and left Y-axis linear motor coils. Thus, Y-axis linear motor magnets and Y-axis linear motor coils are easily attached to (removed from) saddle and slide from frontward without removing spindle head, Y-axis guides and the like. Further, the slide can be moved so that the slide and Y-axis linear motor coils do not overlap with the magnet pieces. Therefore, magnet pieces can be easily attached to (removed from) the saddle without attracting the Y-axis linear motor coils under the condition that magnet pieces do not overlap with Y-axis linear motor coils. Still further, Y-axis linear motor coils can be easily attached to (removed from) the slide without being attracted by magnet pieces under the condition that the rear surface of the slide faces to the saddle surface from which magnet pieces are removed.

Magnet pieces configuring X-axis linear motor magnets are fastened to the front surface of the column by way of bolts inserted from frontward to bolt holes bored at magnet pieces. A plurality of bolts inserted from frontward to bolt holes bored at upper end and lower end of the saddle is screwed into upper and lower X-axis linear motor coils. Thus, X-axis linear motor magnets and X-axis linear motor coils are easily attached to (removed from) column and the saddle from frontward without removing the slide and the like. Further, the saddle can be moved so that the saddle and X-axis linear motor coils do not overlap with the magnet pieces. Therefore, magnet pieces can be easily attached to (removed from) the column without attracting the X-axis linear motor coils under the condition that magnet pieces do not overlap with X-axis linear motor coils. Still further, X-axis linear motor coils can be easily attached to (removed from) the saddle without being attracted by magnet pieces under the condition that the rear surface of the saddle faces to the column surface from which magnet pieces are removed.

(Second Embodiment)

Figure 6:
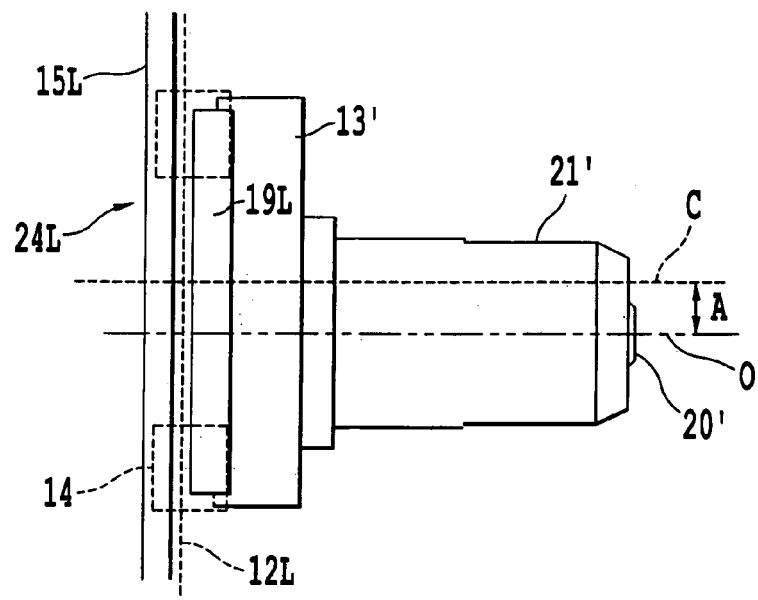
FIG. 6 is a side view showing a Y-axis guide and a spindle head according to a second embodiment of the present invention.

In a linear motor operated machine tool according to a second embodiment, a center of right and left Y-axis linear motor coils in the Y-axis direction is placed at upper side of a center of the rotation of the spindle 20. The construction of the machine tool in this embodiment is same as the construction in the first embodiment except for the placement of the center of the Y-axis linear motor coils 19R and 19L. As shown in FIG. 6, the sliding members 14 fixed to a slide 13' are supported by right and left Y-axis guides 12R and 12L. The slide 13' is mounted on the front surface of the saddle 4 so as to be slidably in the Y-axis direction. In the front surface of the saddle 4, right and left Y-axis linear motor magnets 15R and 15L are attached to right side and left side of right and left Y-axis guide 12R and 12L in the direction of the Y-axis with making pole surface thereof face to front side. Right and left Y-axis linear motor coils 19R and 19L are fixed on right end and left end of the rear surface of the slide 13' with facing to right and left Y-axis linear motor magnets 15R and 15L. The spindle head 21' which rotatably supports the spindle 20' is fixed to the slide 13'. In this case, spindle head 21' is positioned and fixed to the slide 13' so that the center C of the right and left Y-axis linear motor coils 19R and 19L in the Y-axis direction is apart upwardly from the rotating center O of the spindle 20' with predetermined distance A.

In addition to advantages of the first embodiment, the second embodiment of the present invention provides following advantage.

Because the center of right and left Y-axis linear motor coils is upwardly apart from the rotating center of the spindle, resultant of force F caused by right and left Y-axis linear motors acts on the spindle at upper portion than the rotating center thereof. Thus, the resultant of force attracts the slide to cancel the downward inclination of the tip of the spindle caused by its own mass, that is resultant of force attracts the slide so as to lift the tip of the spindle. Consequently, the spindle can be supported in the ideal horizontal direction only by following steps; a step for mounting the spindle to spindle head so as to be rectangular to the Y-axis guides which are disposed in the vertical direction, a step for fixing the spindle head to the slide, a step for mounting the slide to Y-axis guides. Therefore, machining accuracy of the machine tool is improved. Further, it is not required the reinforcing rib which is conventionally disposed on the slide or the like to preventing the spindle head from the downward inclination. Therefore, moving components such as slide, spindle head and the like can be weight saved, whereby movement speed of moving components can improved. Still further, cost reducing can be performed by omitting the adjusting operation for eliminating the inclination of the spindle.

(Third Embodiment)

A machine tool according to a third embodiment is same as the one of the first embodiment except for actuating mechanism for table 26. The same components as the first embodiment has same references and explanations thereof are omitted.

Figure 7:
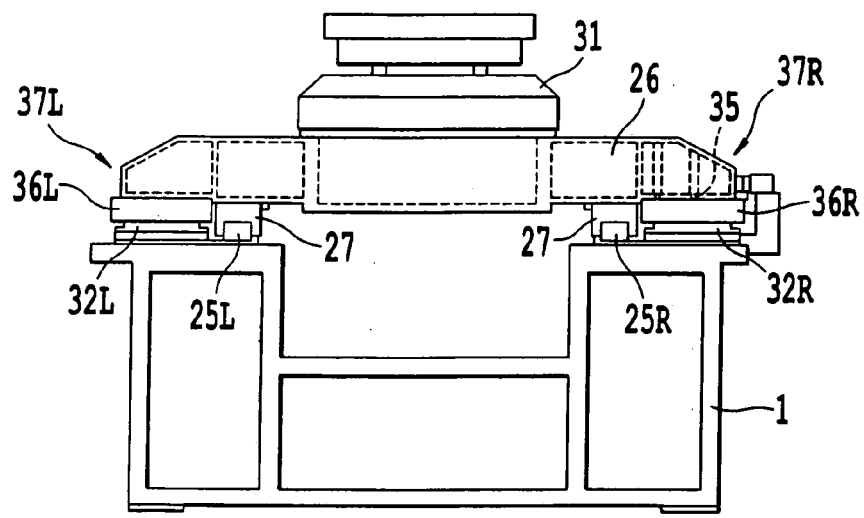
FIG. 7 is a front view showing a part of a table according to a third embodiment.
Figure 8:
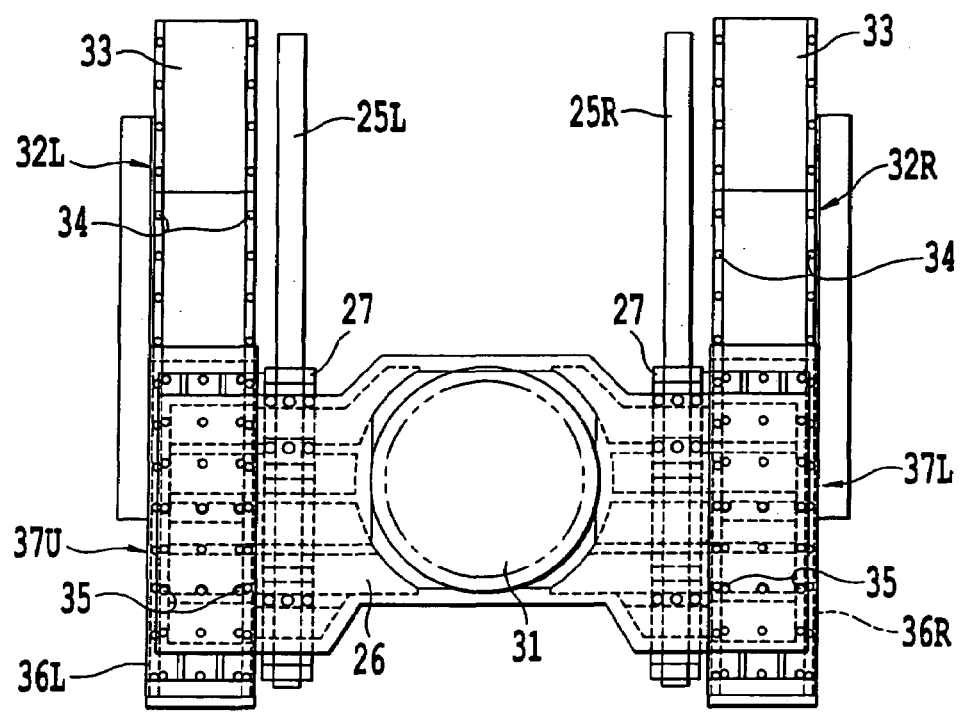
FIG. 8 is a plane view showing the part of the table according to the third embodiment.

As shown in FIGS. 7 and 8, on the upper surface of the bed 1, a plurality of the rectangular magnet pieces 33 is disposed on right side and left side of the right and left Z-axis guides 25R and 25L in the direction of the Z-axis with making pole surfaces thereof face to upward. Magnet pieces 33 configuring the right and left Z-axis linear motor magnet 32R and 32L are fastened to the bed 1 by way of bolts 34 inserted from upward to bolt holes bored at both side ends of magnet pieces 33. A plurality of bolts is screwed into right and left Z-axis linear motor coils 36R and 36L through bolt holes which are formed at the right end and left end of the table 26 from upward. Thus, right and left Z-axis linear motor coils 36R and 36L are fixed on the right side and left side of the inferior surface of the table 26 with opposing to right and left Z-axis linear motor magnets 32R and 32L The right Z-axis linear motor magnet 32R and the right Z-axis linear motor coil 36R configures the right Z-axis linear motor 37R and the left Z-axis linear motor magnet 32L and the left Z-axis linear motor coil 36L configures the left Z-axis linear motor 37L.

According to third embodiment, the tool can be relatively controlled to the workpiece in the direction of mutually perpendicular three axes (X-, Y- and Z-axis) by the linear motor with high speed and high accuracy. Further, right and left Z-axis linear motor magnets are fixed on the top surface of the bed with making pole surface thereof face to upward. Right and left Z-axis linear motor coils are attached to right side and left side inferior surface of the table with opposing to right and left Z-axis linear motors. Therefore, Z-axis linear motor magnets and Z-axis linear motor coils are easily attached to (removed from) the bed and the table.

(Fourth Embodiment)

Figure 9:
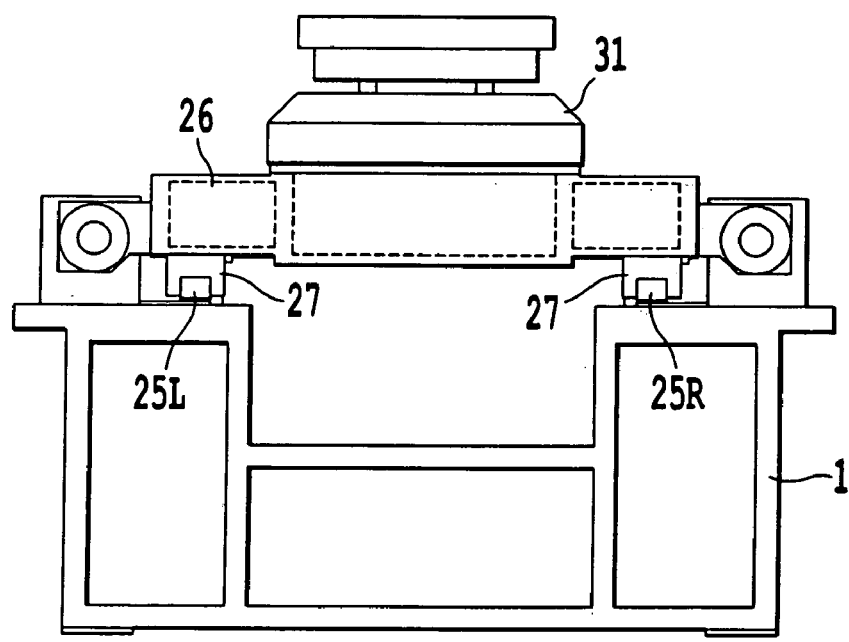
FIG. 9 is a front view showing a part of a table according to a fourth embodiment.
Figure 10:
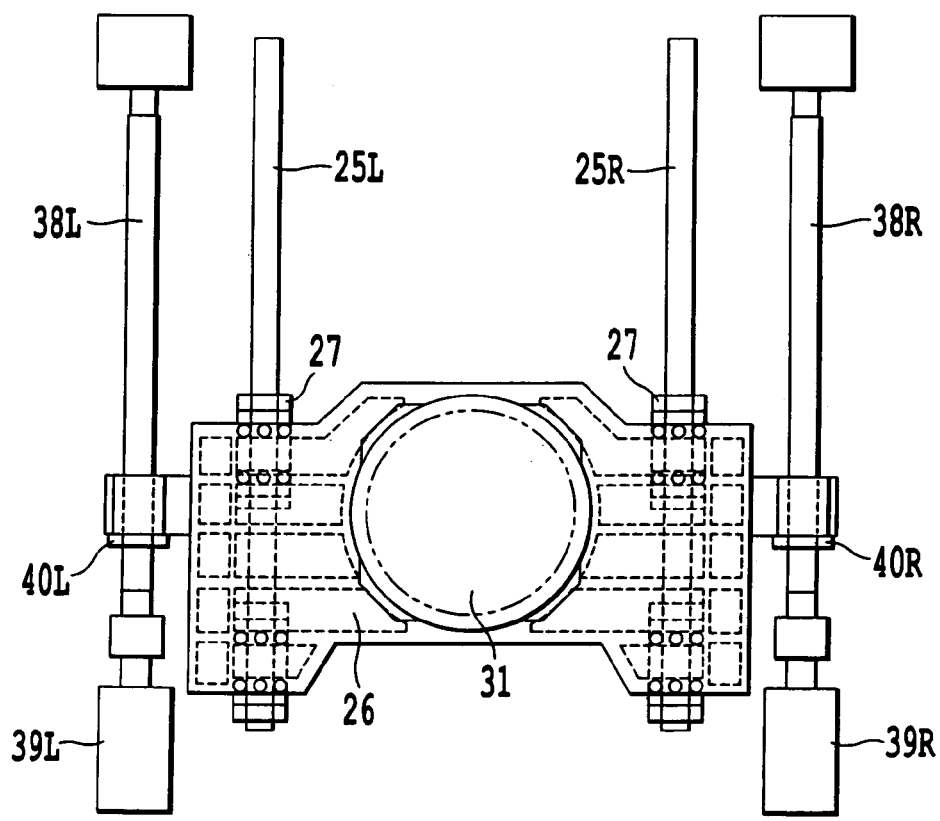
FIG. 10 is a plane view showing the part of the table according to the fourth embodiment.

A linear motor operated machine tool according to a fourth embodiment of the present invention will be described with reference to FIGS. 9 and 10. In the top surface of the bed 1, right and left Z-axis ball screws 38R and 38L are supported on right side and left side of the right Z-axis guide 25R and left Z-axis guide 25L. Right and left Z-axis ball screws 38R and 38L are rotatably actuated by servo motors 39R and 39L which are fixed on the bed 1. Right and left Z-axis ball screws 38R and 38L are screwed into feeding nuts 40R and 40L which are fixed to both ends of the table 26.

According to the fourth embodiment, the machine tool includes right and left Z-axis ball screws. Relative movement between the tool and the workpiece in the X-axis and Y-axis direction, which requires high speed movement, is actuated by the linear motors. The movement of the table on which weighty workpiece is mounted in the direction of the Z-axis is actuated by the servo motor through ball screw mechanism at a relatively low speed. Therefore, actuating mechanism for Z-axis is simplified and cost saved. As a result, whole structure of the machine tool is simplified and cost saved.

The embodiments of the present invention have been described in the foregoing specification and drawings. However, the invention which is intended to be protected is not to be construed as limited to the particular embodiment disclosed. Further, the embodiment described herein is to be regarded as illustrative rather than restrictive. Plural objectives are achieved by the present invention, and yet there is usefulness in the present invention as far as one of the objectives are achieved. Variations and changes may be made by others, and equivalents employed, without departing from spirit of the present invention. Accordingly, it is expressly intended that all variations, changes and equivalents which fall within the spirit and scope of the present invention as defined in the claims, be embraced thereby.

We claim:

1. A linear motor actuated machine tool comprising:
    a bed;
    a vertically extending column mounted on the bed;
    upper and lower X-axis guides extending in a horizontal direction and attached to upper and lower portions of a front surface of the column, wherein the front surface of the column extends in a plane parallel to the X-axis and the Y-axis;
    a saddle mounted on the front surface of the column such that a rear surface of the saddle faces the front surface of the column and so as to be guided by the upper and lower X-axis guides, the saddle having a through space at the center portion thereof;
    upper and lower X-axis linear motor magnets fixed on the front surface of the column at a respective upper side and lower side of the upper and lower X-axis guides in the direction of the X-axis such that pole surfaces thereof face frontward;
    upper and lower X-axis linear motor coils respectively fixed to an upper end and a lower end of the rear surface of the saddle so as to oppose the upper and lower X-axis linear motor magnets;
    right and left vertically extending Y-axis guides attached to a front surface of the saddle at both sides of the through space, wherein the front surface of the saddle extends in a plane parallel to the X-axis and the Y-axis;
    a slide mounted on the front surface of the saddle such that a rear surface of the slide faces the from surface of the saddle and so as to be guided by the right and left Y-axis guides;
    right and left Y-axis linear motor magnets fixed on the front surface of the saddle at a respective right side and left side of the right and left Y-axis guides in the direction of the Y-axis such that pole surfaces thereof face frontward, wherein each of the right and left Y-axis linear motor magnets comprise plural magnet pieces;
    right and left Y-axis linear motor coils respectively fixed to a right end and a left end of the rear surface of the slide so as to oppose the right and left Y-axis linear motor magnets;
    a spindle being capable of attaching the tool;
    a spindle head rotatably supporting the spindle and integrally fixed to the slide, and whose back end expands toward the though space;
    a table mounted on the bed at a location facing the front surface of the saddle to be movable in the direction of the Z-axis which is perpendicular to the X-axis and Y-axis, and on which a workpiece may be mounted,
    wherein a center of the right and left Y-axis linear motor coils in the direction of the Y-axis is upwardly spaced from a rotating center of the spindle.

2. The linear motor operated machine tool according to claim 1 wherein:
    right and left Y-axis linear motor magnets comprise plural magnet pieces, and
    said plural magnet pieces are fastened to the saddle by bolts inserted to bolt holes bored at both ends of the magnet pieces; and
    a plurality of bolts inserted to bolt holes bored at right end and left ends of the slide are screwed into right and left Y-axis linear motor coils.

3. The linear operated machine tool according to claim 1, wherein a length of each of the magnet pieces of the Y-axis linear magnets and a movable range of the slide are set such that for each and every one of the plural magnet pieces, the slide may be positioned so that the slide and the Y-axis linear motor coils do not overlap with said one of the magnet pieces.

4. The linear motor operated machine tool according to claim 3 wherein:
    said plural magnet pieces are fastened to the column by bolts inserted to bolt holes bored at both ends of the magnet pieces; and
    a plurality of bolts inserted to bolt holes bored at upper end and lower ends of the saddle are screwed into upper and lower X-axis linear motor coils.

5. The linear operated machine tool according to claim 1, wherein a length of each of the magnet pieces of the X-axis linear magnets and a movable range of the saddle are set such that for each and every one of the plural magnet pieces, the saddle may be positioned so that the saddle and the X-axis linear motor coils do not overlap with said one of the magnet pieces.

6. A linear motor actuated machine tool comprising;

a bed;

a vertically extending column mounted on the bed;

upper and lower X-axis guides extending in a horizontal direction and attached to upper and lower portions of a front surface of the column, wherein the front surface of the column extends in a plane parallel to the X-axis and the Y-axis;

a saddle mounted on the front surface of the column such that a rear surface of the saddle faces the from surface of the column and so as to be guided by the upper and lower X-axis guides, the saddle having a through space at the center portion thereof;

upper and lower X-axis linear motor magnets fixed on the front surface of the column at a respective upper side and lower side of the upper and lower X-axis guides in the direction of the X-axis such that pole surfaces thereof face frontward;

upper and lower X-axis linear motor coils respectively fixed to an upper end and a lower end of the rear surface of the saddle so as to oppose the upper and lower X-axis linear motor magnets;

right and left vertically extending Y-axis guides attached to a front surface of the saddle at both sides of the through space, wherein the front surface of the saddle extends in a plane parallel to the X-axis and the Y-axis;

a slide mounted on the front surface of the saddle such that a rear surface of the slide faces the from surface of the saddle and so as to be guided by the right and left Y-axis guides;

right and left Y-axis linear motor magnets fixed on the front surface of the saddle at a respective right side and left side of the right and left Y-axis guides in the direction of the Y-axis such that pole surfaces thereof face frontward, wherein each of the right and left Y-axis linear motor magnets comprise plural magnet pieces;

right and left Y-axis linear motor coils respectively fixed to a right end and a left end of the rear surface of the slide so as to oppose the right and left Y-axis linear motor magnets;

a spindle being capable of attaching the tool;

a spindle head rotatably supporting the spindle and integrally fixed to the slide, and whose back end expands toward the though space;

a table mounted on the bed at a location facing the front surface of the saddle to be movable in the direction of the Z-axis which is perpendicular to the X-axis and Y-axis, and on which a workpiece may be mounted, right and left Z-axis guides attached to the top surface of the bed in the direction of the Z-axis which is perpendicular to the X-axis and Y-axis, wherein the table is mounted on the bed and guided by the right and left Z-axis guides;

right and left Z-axis ball screws supported on the top surface of the bed so as to be expandable in the direction of the Z-axis and so as to be rotatably actuated by a servo motors;

feeding nuts fixed to the right end and left ends of the table, wherein right and left Z-axis ball screws are screwed into feeding nuts;

wherein the right and left Y-axis linear motor magnets comprise plural magnet pieces, and said plural magnet pieces are fastened to the saddle by bolts inserted to bolt holes bored at both ends of the magnet pieces; and a plurality of bolts inserted to bolt holes bored at right end and left ends of the slide are screwed into right and left Y-axis linear motor coils;

wherein a length of each of the magnet pieces of the Y-axis linear magnets and a movable range of the slide are set such that for each and every one of the plural magnet pieces, the slide may be positioned so that the slide and the Y-axis linear motor coils do not overlap with said one of the magnet pieces;

the upper and lower X-axis linear motor magnets comprise plural magnet pieces, and said plural magnet pieces are fastened to the column by bolts inserted to bolt holes bored at both ends of the magnet pieces;

a plurality of bolts inserted to bolt holes bored at upper end and lower ends of the saddle are screwed into upper and lower X-axis linear motor coils;

wherein a length of each of the magnet pieces of the X-axis linear magnets and a movable range of the saddle are set such that for each and every one of the plural magnet pieces, the saddle may be positioned so that the slide and the X-axis linear motor coils do not overlap with said one of the magnet pieces, and a center of the right and left Y-axis linear motor coils in the direction of the Y-axis is upwardly spaced from a rotating center of the spindle.

* * * * *